United States Patent
Cai et al.

(10) Patent No.: US 10,853,098 B2
(45) Date of Patent: Dec. 1, 2020

(54) INTERFACE PROCESSING METHOD, ELECTRONIC DEVICE, AND GRAPHICAL USER INTERFACE

(71) Applicant: HUAWEI TECHNOLOGIES CO., LTD., Shenzhen (CN)

(72) Inventors: Mingxing Cai, Nanjing (CN); Fen Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 85 days.

(21) Appl. No.: 15/995,132

(22) Filed: Jun. 1, 2018

(65) Prior Publication Data

US 2018/0276012 A1 Sep. 27, 2018

Related U.S. Application Data

(63) Continuation of application No. PCT/CN2016/108078, filed on Nov. 30, 2016.

(30) Foreign Application Priority Data

Dec. 1, 2015 (CN) .......................... 2015 1 0873899

(51) Int. Cl.
*G06F 15/16* (2006.01)
*G06F 9/451* (2018.01)
(Continued)

(52) U.S. Cl.
CPC ............ *G06F 9/451* (2018.02); *G06F 3/0482* (2013.01); *G06F 3/04817* (2013.01);
(Continued)

(58) Field of Classification Search
CPC .......... G06F 9/451; G06F 9/452; G06F 21/31; G06F 21/6218; G06F 3/0482;
(Continued)

(56) References Cited

U.S. PATENT DOCUMENTS

| 5,627,964 A * | 5/1997 | Reynolds ............ G06F 11/1417 714/46 |
| 2003/0061314 A1 * | 3/2003 | Wang .................... G06F 9/4416 709/220 |

(Continued)

FOREIGN PATENT DOCUMENTS

| CN | 102075546 A | 5/2011 |
| CN | 103113190 A | 5/2013 |

(Continued)

*Primary Examiner* — Richard G Keehn
(74) *Attorney, Agent, or Firm* — Kilpatrick Townsend & Stockton LLP

(57) ABSTRACT

An interface processing method, an electronic device, and a graphical user interface are provided. The method includes: displaying, by the electronic device, a basic function interface that includes a first-type application interface element, where the basic function interface is corresponding to a simple operating system; when the electronic device establishes a connection to the server, receiving, by the electronic device, a second-type application interface element that is of a complete operating system and that is sent by a server; and displaying, by the electronic device, a system function interface that includes the second-type application interface element according to the second-type application interface element received by the electronic device, where the system function interface is corresponding to the complete operating system.

6 Claims, 9 Drawing Sheets

An electronic device displays a basic function interface that includes a first-type application interface element, where the basic function interface is corresponding to a simple operating system — S101

When the electronic device establishes a connection to the server, the electronic device receives a second-type application interface element that is of a complete operating system and that is sent by a server — S102

The electronic device displays a system function interface that includes the second-type application interface element according to the received second-type application interface element, where the system function interface is corresponding to the complete operating system — S103

(51) Int. Cl.
*G06F 21/31* (2013.01)
*H04L 29/08* (2006.01)
*G06F 21/62* (2013.01)
*G06F 3/0481* (2013.01)
*G06F 3/0482* (2013.01)
*H04L 29/06* (2006.01)

(52) U.S. Cl.
CPC .......... *G06F 21/31* (2013.01); *G06F 21/6218* (2013.01); *H04L 67/1002* (2013.01); *H04L 67/34* (2013.01); *H04L 67/42* (2013.01); *G06F 9/452* (2018.02); *G06F 2221/2133* (2013.01); *H04L 63/08* (2013.01); *Y02D 30/40* (2018.01)

(58) Field of Classification Search
CPC .......... G06F 3/4817; G06F 2221/2133; H04L 67/34; H04L 67/42; H04L 67/1002; H04L 63/08; Y02D 30/40
See application file for complete search history.

(56) References Cited

U.S. PATENT DOCUMENTS

| | | | |
|---|---|---|---|
| 2005/0005005 A1* | 1/2005 | Styles | G06F 21/575 709/223 |
| 2006/0010074 A1* | 1/2006 | Zeitsiff | G06F 21/10 705/52 |
| 2011/0209064 A1* | 8/2011 | Jorgensen | G06F 9/54 715/733 |
| 2011/0231443 A1* | 9/2011 | Hannel | H04L 63/105 707/776 |
| 2012/0151206 A1* | 6/2012 | Paris | H04L 9/3234 713/155 |
| 2012/0293819 A1* | 11/2012 | Doui | H04L 63/083 358/1.13 |
| 2013/0185331 A1* | 7/2013 | Conemac | G06F 16/27 707/783 |
| 2014/0032644 A1* | 1/2014 | Saxena | H04L 67/10 709/203 |
| 2014/0149998 A1 | 5/2014 | Kumar et al. | |
| 2015/0082392 A1* | 3/2015 | Gregg | G06F 21/335 726/4 |
| 2015/0101020 A1* | 4/2015 | Kwok | H04L 63/20 726/4 |
| 2015/0143508 A1* | 5/2015 | Halibard | G06F 9/24 726/18 |
| 2015/0237025 A1* | 8/2015 | Pal | H04L 63/06 713/165 |
| 2015/0363211 A1* | 12/2015 | Milman | H04L 63/083 713/2 |
| 2017/0123813 A1* | 5/2017 | Wang | H04L 67/34 |

FOREIGN PATENT DOCUMENTS

| | | | | |
|---|---|---|---|---|
| CN | 103118190 A | * | 5/2013 | |
| CN | 103399792 A | | 11/2013 | |
| CN | 103761088 A | * | 4/2014 | ............ G06F 21/31 |
| CN | 103761088 A | | 4/2014 | |
| CN | 103777981 A | | 5/2014 | |
| EP | 2017725 A1 | | 1/2009 | |

* cited by examiner

30. A user delivers an operation instruction for a system function interface to an electronic device

31. The electronic device receives the operation instruction of the user, and sends the operation instruction to the server

32. The server processes the operation instruction according to stored complete operating system data

33. The server sends a processed operation instruction to the electronic device

34. The server displays the processed result

FIG. 5c

40. An electronic device determines that it is disconnected from a server

41. The electronic device displays a basic function interface

FIG. 5d ns a continuation of International Application No. PCT/CN2016/108078, filed on Nov. 30, 2016, which claims priority to Chinese Patent Application No. 201510873899.2, filed on Dec. 1, 2015. The disclosures of the aforementioned applications are hereby incorporated by reference in their entireties.

TECHNICAL FIELD

The present invention relates to the field of communications technologies, and in particular, to an interface processing method, an electronic device, and a graphical user interface.

BACKGROUND

An interface of an electronic device is a medium for transferring and exchanging information between a user and the electronic device, and is a set that supports software, hardware, and a method and that is used for performing two-way information exchange between the user and a system. After an interface of an electronic device is configured, by using the interface, a user can deliver an instruction to the electronic device and receive an instruction fed back by the machine.

In the prior art, an interface of an electronic device is usually configured in the following two manners:

Manner 1: A user configures the interface of the electronic device. Specifically, a series of configuration interfaces are often displayed when the electronic device such as a mobile phone or a pad is turned on for the first time, and before using the electronic device, the user needs to complete one-by-one configuration. In addition, with technology development, the user also needs to manually detect and update an operating system version when a new operating system comes out.

Manner 2: An operator configures the interface of the electronic device. This configuration manner is applicable to a customized electronic device. Specifically, the customized electronic device such as a mobile phone customized by China Mobile needs to be transported to the operator, and the operator installs customized information on the electronic device before the electronic device is sold.

However, for manner 1, the user needs to spend a relatively long configuration time, and an operation is complex. In addition, an operation response of a function interface is performed on an electronic device side, and this increases power consumption of the electronic device. For manner 2, the electronic device needs to be transported to the operator, thereby causing relatively high operating costs.

SUMMARY

Embodiments of the present invention provide an interface processing method, an electronic device, and a graphical user interface, so that a user does not need to configure an interface, power consumption of the electronic device is greatly reduced during interface configuration, and operating costs of an operator are efficiently reduced.

According to a first aspect of the present invention, an interface processing method is provided. The interface processing method includes:

displaying a basic function interface that includes a first-type application interface element, where the basic function interface is corresponding to a simple operating system, the simple operating system is used to implement a basic function application of an electronic device, and the first-type application interface element is used to enable the basic function application in the simple operating system;

when the electronic device establishes a connection to the server, receiving, by the electronic device, a second-type application interface element that is of a complete operating system and that is sent by a server, where the complete operating system is used to implement the basic function application and an additional function application of the electronic device, and the second-type application interface element is used to enable the basic function application and the additional function application in the complete operating system; and displaying a system function interface that includes the second-type application interface element according to the second-type application interface element received by the electronic device, where the system function interface is corresponding to the complete operating system.

It can be learned from the foregoing steps that data processing in response to an operation instruction entered by a user is completed on the server that stores the complete operating system, and a processor of the electronic device only needs to complete steps of controlling reception and controlling displaying. This minimizes occupation of a processing resource. In this embodiment of the present invention, the system function interface that includes the basic function and the additional function and that is of the electronic device may be configured by the server. Compared with a manner in which a user or an operator configures an interface on an electronic device side in the prior art, this manner in which the interface is configured by the server has the following advantages: The user does not need to spend a long time for one-by-one configuration, and power consumption of the electronic device is greatly reduced during interface configuration; and the electronic device does not need to be transported to the operator for configuration, thereby reducing operating costs of the operator.

With reference to the first aspect, in a first possible implementation of the first aspect, when the electronic device establishes a connection to the server, before the receiving, by the electronic device, a second-type application interface element that is of a complete operating system and that is sent by a server, the interface processing method further includes:

sending, by the electronic device, verification information entered by a user to the server for verification; and the receiving, by the electronic device, a second-type application interface element that is of a complete operating system and that is sent by a server is specifically: if the verification succeeds, receiving, by the electronic device, the second-type application interface element that is of the complete operating system and that is sent by the server.

The foregoing steps of verification information can improve security when the electronic device obtains entry information of the complete operating system.

With reference to the first aspect or the first possible implementation of the first aspect, in a second possible implementation of the first aspect, after the displaying a system function interface that includes the second-type application interface element according to the second-type application interface element received by the electronic device, the interface processing method further includes:

when the electronic device is disconnected from the server, obtaining the basic function interface stored in the electronic device, and displaying the basic function interface on the electronic device.

With reference to the first aspect, in a third possible implementation of the first aspect, after the displaying a basic function interface that includes the first-type application interface element, and before the receiving, by the electronic device, a second-type application interface element that is of a complete operating system and that is sent by the server, the interface processing method further includes:

receiving, by the electronic device, a first switching instruction for interface switching that is entered by the user, where the first switching instruction is used to switch the basic function interface to the system function interface; and sending, by the electronic device, the received first switching instruction to the server; and when the electronic device establishes a connection to the server, the receiving, by the electronic device, a second-type application interface element that is of a complete operating system and that is sent by a server is specifically:

when the electronic device establishes a connection to the server, and the server responds to the first switching instruction and sends the second-type application interface element of the complete operating system, receiving, by the electronic device, the second-type application interface element that is of the complete operating system and that is sent by the server.

With reference to any one of the first aspect or the foregoing possible implementations of the first aspect, in a fourth possible implementation of the first aspect, after the displaying a system function interface that includes the second-type application interface element, the interface processing method further includes:

receiving, by the electronic device, a second switching instruction for interface switching that is entered by the user, where the second switching instruction is used to switch the system function interface to the basic function interface; and displaying the basic function interface that includes the first-type application interface element according to the received second switching instruction.

According to a second aspect of the present invention, an electronic device is provided. The electronic device includes:

a display unit, configured to display a basic function interface that includes a first-type application interface element, where the basic function interface is corresponding to a simple operating system, the simple operating system is used to implement a basic function application of the electronic device, and the first-type application interface element is used to enable the basic function application in the simple operating system;

a communications connection unit, configured to establish a communications connection to a server; and a receiving unit, configured to receive, when the communications connection unit establishes a communications connection to the server, a second-type application interface element that is of a complete operating system and that is sent by the server, where the complete operating system is used to implement the basic function application and an additional function application of the electronic device, and the second-type application interface element is used to enable the basic function application and the additional function application in the complete operating system; where the display unit is further configured to display a system function interface that includes the second-type application interface element according to the second-type application interface element received by the receiving unit, where the system function interface is corresponding to the complete operating system.

With reference to the second aspect, in a first possible implementation of the second aspect, the electronic device further includes a first sending unit, and when the communications connection unit establishes a communications connection to the server, the first sending unit sends verification information entered by a user to the server for verification; and if the verification succeeds, the receiving unit is specifically configured to receive the second-type application interface element that is of the complete operating system and that is sent by the server.

With reference to the second aspect or the first possible implementation of the second aspect, in a second possible implementation of the second aspect, when the communications connection unit is disconnected from the server, the display unit is further configured to display the basic function interface on the electronic device, and a processing unit obtains the basic function interface stored in the electronic device.

With reference to the second aspect, in a third possible implementation of the second aspect, the receiving unit is further configured to receive a first switching instruction for interface switching that is entered by the user, where the first switching instruction is used to switch the basic function interface to the system function interface;

the electronic device further includes a second sending unit, and the second sending unit is configured to send the first switching instruction received by the receiving unit to the server; and the receiving unit is further configured to:

when the communications connection unit establishes a communications connection to the server, and the server responds to the first switching instruction and sends the second-type application interface element of the complete operating system receive the second-type application interface element that is of the complete operating system and that is sent by the server.

With reference to any one of the second aspect or the foregoing possible implementations of the second aspect, in a fourth possible implementation of the second aspect, the receiving unit is further configured to receive a second switching instruction for interface switching that is entered by the user, where the second switching instruction is a switching instruction for switching the system function interface to the basic function interface; and the display unit is further configured to display the basic function interface that includes the first-type application interface element according to the received second switching instruction.

According to a third aspect, an electronic device is provided. The electronic device includes: a display screen, an input device, a processor, a memory, a communications interface, and a bus, where the processor, the memory, and the communications interface are connected and complete mutual communication by using the bus, where the input device is configured to receive an instruction entered by a user, and transmit the instruction entered by the user by using the input device to the processor;

the memory is configured to store executable program code, where the program code includes a computer operation instruction; and the processor runs a program corresponding to the executable program code by reading the executable program code stored in the memory, so as to:

display, on the display screen, a basic function interface that includes a first-type application interface element, where the basic function interface is corresponding to a simple operating system, the simple operating system is used to implement a basic function application of the electronic device, and the first-type application interface element is used to enable the basic function application in the simple operating system;

when the communications interface establishes a connection to the server, receive a second-type application interface element that is of a complete operating system and that is sent by a server, where the complete operating system is used to implement the basic function application and an additional function application of the electronic device, and the second-type application interface element is used to enable the basic function application and the additional function application in the complete operating system; and display, on the display screen, a system function interface that includes the second-type application interface element according to the second-type application interface element received by the electronic device, where the system function interface is corresponding to the complete operating system.

With reference to the third aspect, in a first possible implementation of the third aspect, when the communications interface establishes a communications connection to the server, the processor is further configured to: send verification information entered by the user to the server for verification; and if the verification succeeds, receive the second-type application interface element that is of the complete operating system and that is sent by the server.

With reference to the third aspect or the first possible implementation of the third aspect, in a second possible implementation of the third aspect, when the communications interface is disconnected from the server, the processor is further configured to: obtain the basic function interface stored in the electronic device, and display the basic function interface on the display screen.

With reference to the third aspect, in a third possible implementation of the third aspect, the processor is further configured to:

receive a first switching instruction for interface switching that is entered by the user, where the first switching instruction is used to switch the basic function interface to the system function interface;

send the received first switching instruction to the server; and when the communications interface establishes a communications connection to the server, and the server responds to the first switching instruction and sends the second-type application interface element of the complete operating system, receive the second-type application interface element that is of the complete operating system and that is sent by the server.

According to a fourth aspect of the present invention, a graphical user interface on an electronic device is provided. The electronic device includes a monitor, a memory, multiple function application programs, and one or more processors configured to execute one or more programs stored in the memory, where the monitor includes a display screen, and the graphical user interface includes:

a basic function interface used to display a first-type application interface element and the like, and a system function interface used to display a second-type application interface element and the like, where the basic function interface is corresponding to a simple operating system, the simple operating system is used to implement a basic function application of the electronic device, the system function interface is corresponding to a complete operating system, and the complete operating system is used to implement the basic function application and an additional function application of the electronic device, where the displaying a basic function interface that includes a first-type application interface element and the like includes:

displaying the first-type application interface element on the display screen, where the first-type application interface element is used to enable the basic function application program in the simple operating system; and stopping displaying the basic function interface when the processor receives an instruction that is for displaying the system function interface and that is sent by a user by using the electronic device; and displaying the system function interface that includes the second-type application interface element includes: displaying the second-type application interface element on the display screen, where the second-type application interface element is used to enable the basic function application program and the additional function application program in the complete operating system.

With reference to the fourth aspect, in a first possible implementation of the fourth aspect, the graphical user interface further includes:

a verification information interface used to display user name information, password information, and the like, and a prompt interface used to display a verification information error, where the verification information interface used to display the user name information, the password information, and the like is displayed, and the verification information interface is located above the basic function interface; and if the processor determines that the verification information is correct, displaying of the basic function interface and the verification information interface stops, and the system function interface used to display the second-type application interface element and the like is displayed; or if the processor determines that the verification information is wrong, the prompt interface used to display a verification information error is displayed.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 5a to FIG. 5d are a flowchart of an interface processing method according to Embodiment 2 of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
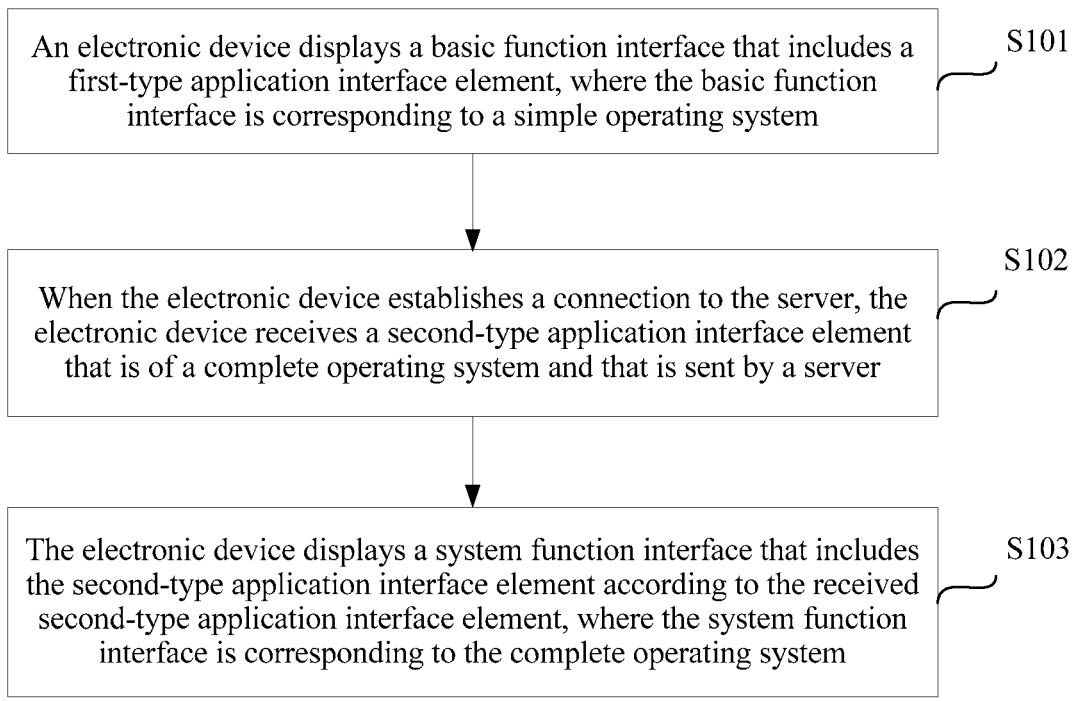
FIG. 1 is a flowchart of an interface processing method according to Embodiment 1 of the present invention.

Embodiment 1 of the present invention provides an interface processing method, applied to an electronic device. The electronic device may be any electronic device with an application interface, such as a mobile phone, a notebook computer, a desktop computer, a tablet computer like PAD, or an in-vehicle computer. As shown in FIG. 1, the interface processing method includes the following steps.

Step S101: The electronic device displays a basic function interface that includes a first-type application interface element, where the basic function interface is corresponding to a simple operating system.

The simple operating system corresponding to the basic function interface is an operating system used to implement a basic function application of the electronic device. The first-type application interface element is used to enable the basic function application in the simple operating system. The basic function application includes at least one of the following: Messaging, Camera, Call, Input Method, Address Book, Contacts, Dialer, Settings, Clock, SIM Card Verification, Data Connection, or the like.

In this embodiment of the present invention, the first-type application interface element does not refer to one application interface element. This type of application interface element refers to multiple application interface elements associated with basic function applications in the simple operating system.

In this embodiment of the present invention, step S101 may be specifically as follows: The electronic device receives a turn-on instruction sent by a user, enables, according to the instruction, the simple operating system stored in the electronic device and the basic function application in the simple operating system, and instructs to display, on a display screen, first-type application interface elements associated with these basic function applications. Then, the electronic device displays, on the display screen of the electronic device, an interface that includes the first-type application interface elements associated with these basic function applications. In this case, the interface displayed on the display screen is the basic function interface corresponding to the simple operating system.

In step S101, the simple operating system is corresponding to the basic function interface. The simple operating system may be prestored in the electronic device, and used to implement the basic function application of the electronic device. The basic function interface is an interface that displays the basic function application of the simple operating system. The user may enable, by selecting an application interface element on the interface, a basic function application that is in the simple operating system and that is associated with the element.

For example, the simple operating system stored in the electronic device can implement basic function applications: Call, Messaging, and Address Book. The basic function interface has multiple application interface elements that display Call, Messaging, and Address Book. Each application interface element is associated with a basic function application in the simple operating system. For example, an application interface element identified as "Messaging" is associated with a Messaging application, and an application interface element identified as "Address Book" is associated with an address book application. When tapping the application interface element corresponding to "Messaging", the user can enable the Messaging application in the simple operating system because the application interface element is associated with the Messaging application.

Figure 2:
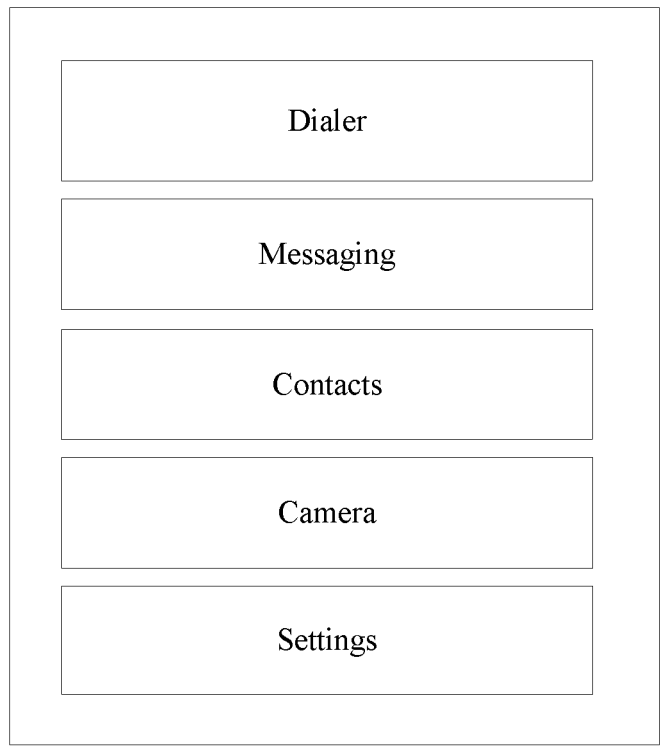
FIG. 2 is an example of a schematic diagram of displaying, on an electronic device, a basic function interface that includes a first-type application interface element according to Embodiment 1 of the present invention.

FIG. 2 is an example of a schematic diagram of a basic function interface that displays a first-type application interface element on an electronic device. Referring to FIG. 2, application interface elements such as Dialer, Messaging, Contacts, Camera, and Settings are displayed on the basic function interface. It can be understood that the foregoing manner of displaying the first-type application interface element is displayed in a text form and in a vertically arranged manner. This type of display manner is merely an example. One of or a combination of other display manners such as a horizontal arrangement, a matrix arrangement, an icon form, and a shortcut form may be selected. In addition, the application interface element may be identified by a graph, a text, or a combination thereof, and this is not limited in the present invention.

Step S102: When the electronic device establishes a connection to the server, the electronic device receives a second-type application interface element that is of a complete operating system and that is sent by a server.

The complete operating system is an operating system that is stored in the server and that implements the basic function application and an additional function application of the electronic device. The second-type application interface element is used to enable the basic function application and the additional function application in the complete operating system.

In this embodiment of the present invention, the second-type application interface element does not refer to one application interface element. The second-type application interface element may be multiple application interface elements associated with the basic function application and the additional function application in the complete operating system.

In step S102, the additional function application may include but is not limited to an advanced communications function, an entertainment function, an application function, and a customization function. The advanced communications function may include but is not limited to a network connection function such as Bluetooth, infrared, and WiFi (Wireless Fidelity). The entertainment function may include but is not limited to a function that enriches user daily life such as Media Player, Game, or Radio. The application function may include but is not limited to a function that can be downloaded such as Flashlight, Microblog, WeChat, Map, or Browser. The customization function may include but is not limited to a function that is customized from an operator such as Caller ID Display, or Ring Back Tone service.

It should be noted that, a different electronic device has an additional function application with different content. An additional function of a particular electronic device may be any one or more of the foregoing listed advanced communications function, entertainment function, application function, and customization function, or may be another additional function known to a person skilled in the art.

A system function interface is corresponding to the complete operating system. The system function interface is an interface that displays a basic function and an additional function of the complete operating system. The user may enable, by selecting an application interface element on the interface, a basic function application and an additional function application that are in the complete operating system and that are associated with the element.

For example, the complete operating system stored in the server can implement basic function applications such as Call, Messaging, and Address Book, and additional function applications such as Game, Microblog, and Caller ID Display. The system function interface has multiple application interface elements that display Call, Messaging, Address Book, Game, Microblog, and Caller ID Display. Each application interface element is associated with a basic function application and an additional function application in the complete operating system. For example, an application interface element identified as "Messaging" is associated with an SMS application, and an application interface element identified as "Microblog" is associated with a Microblog application. When tapping the application interface element corresponding to "Microblog", the user can enable the Microblog application in the complete operating system because the application interface element is associated with the Microblog application.

Optionally, step S102 may be specifically as follows: When receiving an instruction that is for displaying the system function interface and that is sent by the user or sending a connection request to the server that stores the complete operating system, the electronic device sends the instruction for displaying the system function interface to the server that is connected to the electronic device. According to the instruction, the server enables an operating system stored in a memory and programs of multiple basic function applications and additional function applications of the operating system. Then, the server sends second-type application interface elements associated with the basic function applications and the additional function applications to the electronic device. The electronic device receives the second-type application interface elements, so as to display, on a display screen of the electronic device, an interface that includes the second-type application interface elements. In this case, the interface displayed on the display screen is the system function interface corresponding to the complete operating system.

The electronic device may send, in any one of the following two manners, the connection request to the server that stores the complete operating system:

Manner 1: After receiving an instruction for connecting to the server that is entered by the user, the electronic device sends the connection request to the server that stores the complete operating system.

Manner 2: After detecting that the network connection is normal, the electronic device automatically sends the connection request to the server that stores the complete operating system.

Optionally, in a specific embodiment of the present invention, when the electronic device establishes a connection to the server, and before the electronic device receives the second-type application interface element that is of the complete operating system and that is sent by the server, the interface processing method may further include the following steps.

The electronic device sends verification information entered by the user to the server for verification.

In this case, that the electronic device receives a second-type application interface element that is of a complete operating system and that is sent by a server is specifically that if the verification succeeds, the electronic device receives the second-type application interface element that is of the complete operating system and that is sent by the server.

In the specific embodiment, first, the electronic device sends the connection request to the server that stores the complete operating system, and the server returns a response to the electronic device after receiving the connection request, thereby completing the network connection between the server and the electronic device. Next, the electronic device receives the verification information that is used to log in to the server and that is entered by the user, and submits the verification information to the server. Then, the server verifies whether the verification information submitted by the electronic device is correct. If verification fails, the server returns a verification failure result to the electronic device, so that the electronic device displays a verification failure on the display screen of the electronic device. Consequently, the electronic device cannot obtain the second-type application interface element of the complete operating system stored in the server. If verification succeeds, the server sends the second-type application interface element of the complete operating system stored in the server to the electronic device. That is, the electronic device receives the second-type application interface element that is of the complete operating system and that is sent by the server.

The verification information includes but is not limited to a user name, a password, and user biometric feature information. The biometric feature information includes but is not limited to any one piece of information such as a fingerprint, a voice print, or an iris.

Figure 3:
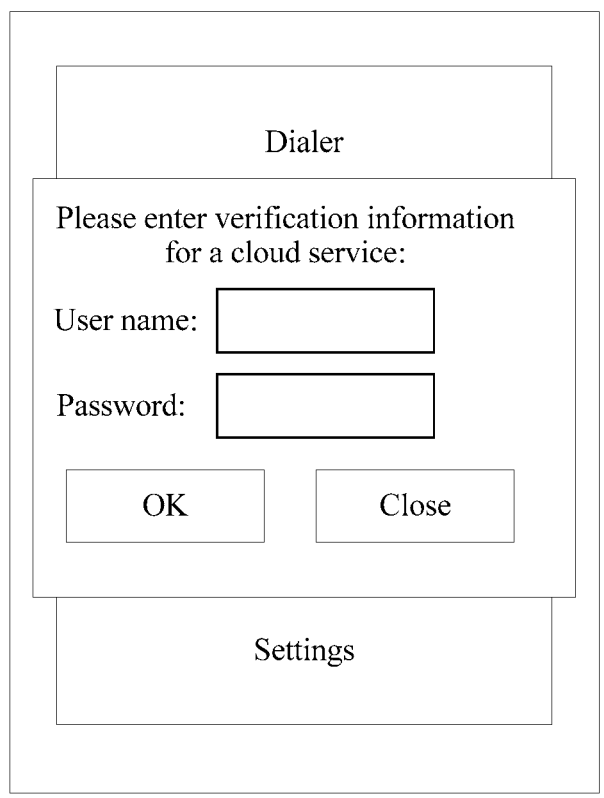
FIG. 3 is an example of a schematic diagram of an interface on which a user enters verification information and that is displayed on an electronic device according to Embodiment 1 of the present invention.

For example, as shown in FIG. 3, FIG. 3 is an example of a schematic diagram of an interface on which a user enters verification information and that is displayed on an electronic device. Referring to FIG. 3, a verification information interface overlays the basic function interface in a pop-up window form. User name information and password information that need to be entered by the user, and "OK" and "Close" instructions that can be tapped by the user are displayed on the verification information interface.

The foregoing manner in which "the server performs verification before sending the second-type application interface element stored in the server to the electronic device" can improve security when the electronic device obtains entry information of the complete operating system.

It should be noted that, if the electronic device is not the first time to obtain the second-type application interface element stored in the server, or the electronic device obtains the second-type application interface element stored in the server within a valid period, the foregoing verification information process may be omitted. That is, after completing a connection to the server that stores the complete operating system, the electronic device automatically loads the second-type application interface element of the operating system of the server.

Optionally, the server stores the complete operating system, application data, and user information of the electronic device. The application data means an application installed on the operating system and data required for running the application. The application data may include a configuration file, a database file, a run file, log information, and the like. The user information includes account information, password information, contact information, location information, and the like that are of the user.

In addition, the complete operating system in the server may be updated, and may be completely updated or partly updated. The server may update the complete operating system according to an update notification pushed by an official website, or may update the complete operating system according to an update instruction entered by a client.

Step S103: The electronic device displays a system function interface that includes the second-type application interface element according to the received second-type application interface element, where the system function interface is corresponding to the complete operating system.

Figure 4:
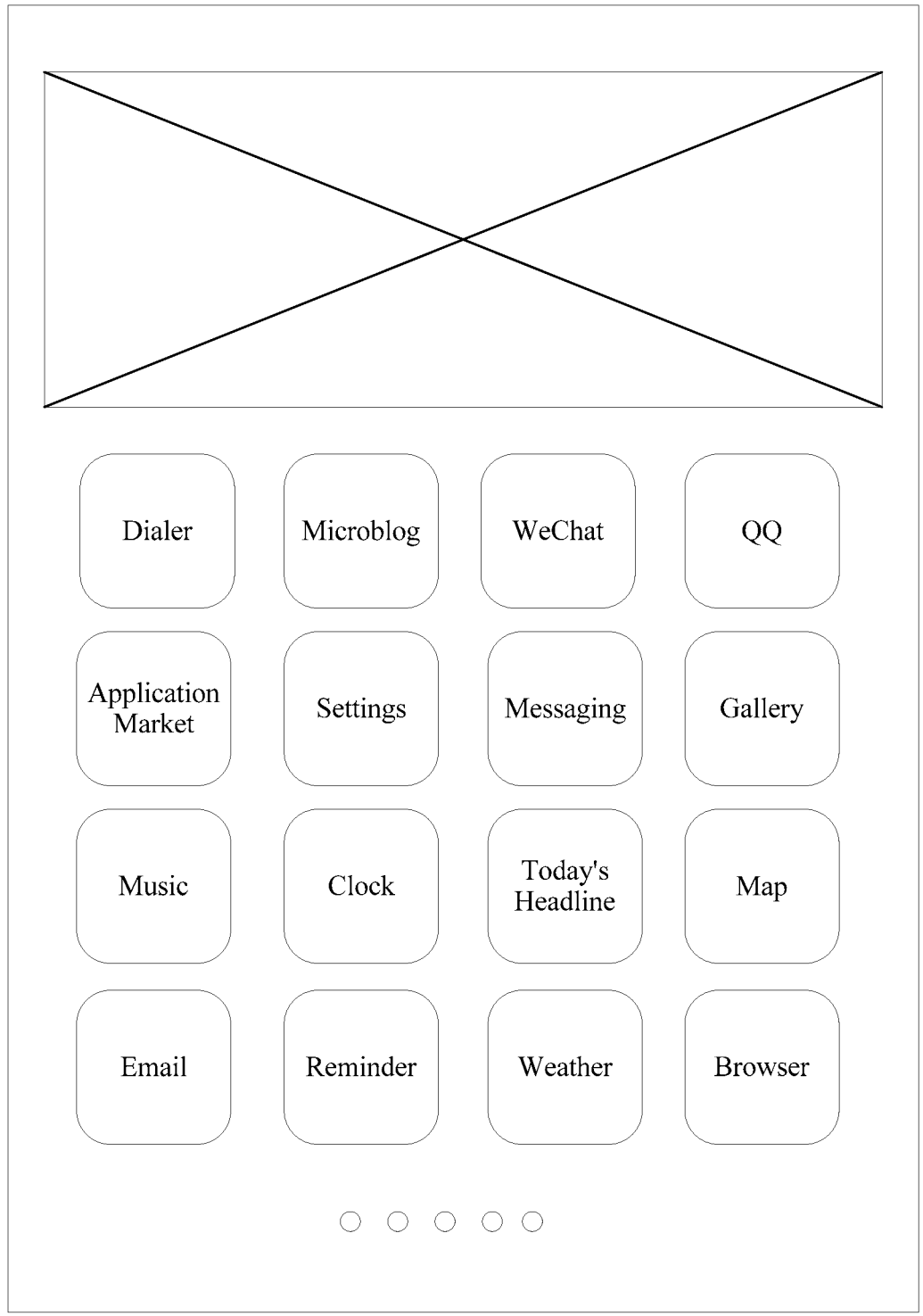
FIG. 4 is an example of a schematic diagram of displaying, on an electronic device, a system function interface that includes a second-type application interface element according to Embodiment 1 of the present invention.

For example, FIG. 4 is an example of a schematic diagram of a system function interface that displays a second-type application interface element on an electronic device. Referring to FIG. 4, the system function interface displays application interface elements of basic function applications such as Dialer, Clock, Messaging, Reminder, and Settings, and also displays application interface elements of additional function applications such as Microblog, WeChat, QQ, Application market, Gallery, Music, Toutiao, Map, Email, Weather, and Browser. It should be noted that a display manner of the system function interface is not limited to an arrangement manner in FIG. 4. One of or a combination of other display manners such as a horizontal arrangement, a vertical arrangement, an icon form, and a shortcut form may be selected, and this is not limited in the present invention.

It can be learned from the foregoing steps that data processing in response to an operation instruction entered by the user is completed on the server that stores the complete operating system, and a processor of the electronic device only needs to complete steps of controlling reception and controlling displaying of a display unit. This minimizes occupation of a processing resource. It is well known to a person skilled in the art that data processing is electricity-consuming. Therefore, this processing manner can efficiently reduce power consumption of the electronic device, thereby prolonging a battery lifespan of the electronic device.

It should be noted that, in this embodiment of the present invention, the server may serve multiple electronic devices, and therefore the basic function in the complete operating system stored in the server may be loaded into multiple electronic devices. However, it is likely that basic functions in simple operating systems separately stored in these terminals are different. For example, a basic function of a feature phone is different from that of a smartphone, and function compatibility of these electronic devices is not always the same. Therefore, not all the basic functions in the complete operating system stored in the server are loaded into each electronic device that the server serves, and the loaded basic functions are not necessarily to be exactly the same as basic functions in a simple operating system stored in the electronic device. Therefore, the basic functions in the complete operating system stored in the server include at least some basic functions in the simple operating system stored in the electronic device. That is, the basic functions in the complete operating system may include all the basic functions in the simple operating system, or may include some basic functions in the simple operating system. According to the interface processing method provided in Embodiment 1 of the present invention, the system function interface that includes the basic function and the additional function and that is of the electronic device may be configured by the server. Compared with a manner in which a user or an operator configures an interface on an electronic device side in the prior art, this manner in which the interface is configured by the server has the following advantages: The user does not need to spend a long time for one-by-one configuration, and power consumption of the electronic device is greatly reduced during interface configuration; and the electronic device does not need to be transported to the operator for configuration, thereby reducing operating costs of the operator.

In real life, the user comes in and goes out of a place without a network signal or a weak network signal, for example, an elevator or a subway. In this case, the electronic device is disconnected from a network of the server that has the complete operating system. In this situation, the electronic device may restore displaying of the basic function interface corresponding to the simple operating system when determining that the network connection to the server is disconnected. Therefore, optionally, in a specific embodiment of the present invention, after the electronic device displays the system function interface corresponding to the complete operating system according to the received second-type application interface element of the complete operating system in step S103, the interface processing method further includes the following steps: When the electronic device is disconnected from the server, obtain the basic function interface stored in the electronic device, and display the basic function interface on the electronic device.

To save power or avoid privacy disclosure, the user wants to manually complete a switching operation between the basic function interface and the system function interface. In this case, optionally, in a specific embodiment of the present invention, after step S101 and before step S102, the interface processing method further includes the following steps:

Step 1021: The electronic device receives a first switching instruction for interface switching that is entered by a user, where the first switching instruction is used to switch the basic function interface to the system function interface.

Step 1022: The electronic device sends the first switching instruction received by the electronic device to the server.

In this case, step S102 is specifically as follows: When the electronic device establishes a communications connection to the server, and the server responds to the first switching instruction and sends the second-type application interface element of the complete operating system, the electronic device receives the second-type application interface element that is of the complete operating system and that is sent by the server.

In another specific embodiment of the present invention, after step S103, the interface processing method further includes the following steps:

Step 1041: The electronic device receives a second switching instruction for interface switching that is entered by a user, where the second switching instruction is used to switch the system function interface to the basic function interface.

Step 1042: The electronic device displays the basic function interface that includes the first-type application interface element according to the received second switching instruction.

In the foregoing two specific embodiments, interface switching instructions entered by the user include the switching instruction for switching the basic function interface to the system function interface and the switching instruction for switching the system function interface to the basic function interface. When the user enters a switching instruction, the electronic device may first determine whether the switching instruction is to switch the basic function interface to the system function interface or switch the system function interface to the basic function interface. According to different switching instructions, a specific switching process may be classified into the following two cases:

First, when a switching instruction is to switch the basic function interface to the system function interface, the electronic device sends the switching instruction to the server. If it is in a normal state, for example, the network connection between the electronic device and the server is normal, the server responds to the switching instruction and sends the second-type application interface element of the complete operating system stored in the server to the electronic device. Therefore, the electronic device displays the system function interface corresponding to the complete operating system according to the second-type application interface element. If it is in an abnormal state, for example, the network connection between the electronic device and the server is disconnected, the server cannot respond to the switching instruction. If the electronic device does not receive, within a preset response time, the second-type application interface element sent by the server, a switching failure may be displayed on the interface of the electronic device.

Second, when a switching instruction is to switch the system function interface to the basic function interface, the electronic device instructs a display module of the electronic device itself to display the basic function interface corresponding to the simple operating system.

It should be noted that the foregoing interface switching instructions entered by the user may be implemented in the following two switching manners:

(1) Hardware switching manner: Specifically, a physical function key is first provided on the electronic device, and the physical function key may be clicked or switched by the user. When the user clicks or switches the physical function key, it indicates that the user enters an interface switching instruction on the electronic device.

(2) Software switching manner: Specifically, an interface switching option is first set on a display interface of the electronic device. For example, a menu for switching to the system function interface is set on the basic function interface of the electronic device, and a menu for switching to the basic function interface is set on the system function interface of the electronic device. When the user selects the interface switching option on the display interface of the electronic device, it indicates that the user enters an interface switching instruction on the electronic device.

Embodiment 2

To make a person skilled in the art better understand a technical solution of an interface processing method provided in this embodiment of the present invention, the following describes the interface processing method provided in the present invention in detail by using a specific embodiment.

In a specific embodiment of the present invention, with reference to FIG. 5a to FIG. 5d, the interface processing method of the embodiment includes the following steps.

Figure 5A:
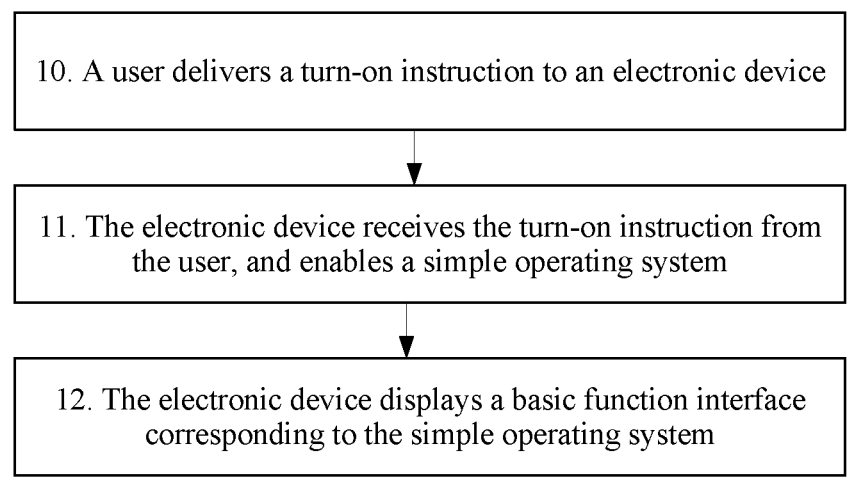

A first stage: As shown in FIG. 5a, the first stage is a stage of enabling and displaying a basic function interface.

10. A user delivers a turn-on instruction to an electronic device.

11. The electronic device receives the turn-on instruction of the user, and enables a simple operating system.

12. The electronic device displays a basic function interface corresponding to the simple operating system.

The simple operating system corresponding to the basic function interface is an operating system that is stored in the electronic device and that implements a basic function application of the electronic device. The basic function interface includes a first-type application interface element. The first-type application interface element is associated with the basic function application in the simple operating system.

Figure 5B:
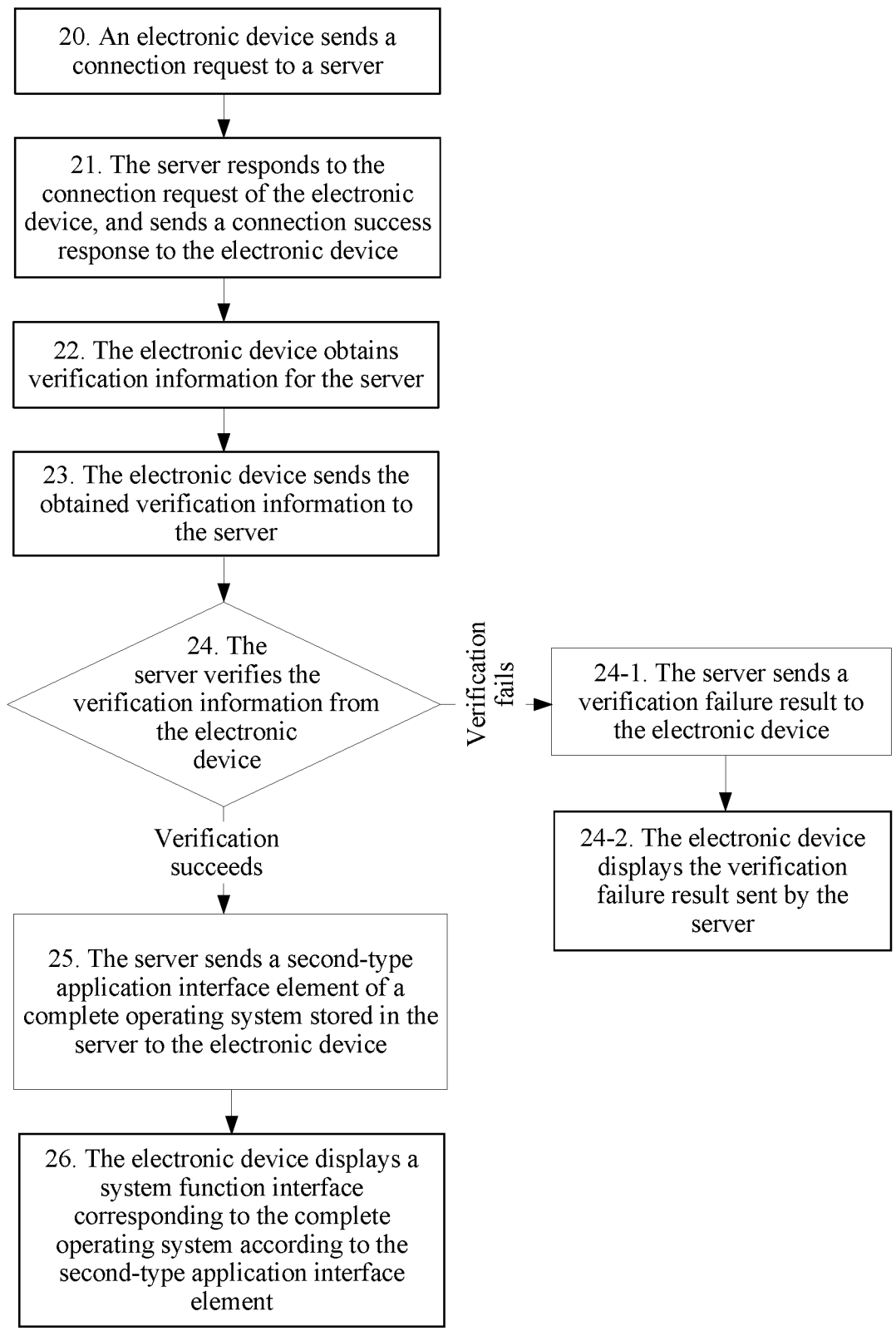

A second stage: As shown in FIG. 5b, the second stage is a stage of displaying a system function interface.

20. The electronic device sends a connection request to a server.

The server stores a complete operating system of the electronic device.

In this step, the electronic device may send the connection request to the server in any one of the following manners: Manner 1, the electronic device sends the connection request to the server after receiving an instruction for connecting to the server that is entered by the user; manner 2, the electronic device automatically sends the connection request to the server after detecting that a network connection is normal; or manner 3, the electronic device sends the connection request to the server after receiving an interface switching instruction entered by the user.

21. The server responds to the connection request of the electronic device, and sends a connection success response to the electronic device.

22. The electronic device obtains verification information for the server.

The electronic device may obtain verification information entered by the user, or may obtain previously stored verification information within a valid period.

23. The electronic device sends the obtained verification information to the server.

24. The server verifies the verification information from the electronic device.

If the server successfully verifies the verification information, go to step 25. If verification performed by the server on the verification information fails, perform the following two steps:

24-1. The server sends a verification failure result to the electronic device.

24-2. The electronic device displays the verification failure result sent by the server.

25. The server sends a second-type application interface element of a complete operating system stored in the server to the electronic device.

26. The electronic device displays a system function interface corresponding to the complete operating system according to the second-type application interface element.

The second-type application interface element is associated with the basic function application and an additional function application in the complete operating system.

In this step, after displaying the system function interface, the electronic device may further receive a switching instruction for switching the system function interface to the basic function interface that is entered by the user, and display the basic function interface corresponding to the simple operating system.

A third stage: As shown in FIG. 5c, the third stage is a stage of receiving and processing an operation instruction of the user on the system function interface.

30. The user delivers an operation instruction for the system function interface to the electronic device.

31. The electronic device receives the operation instruction of the user, and sends the operation instruction to the server.

32. The server processes the operation instruction according to stored application data.

33. The server sends a processed operation instruction to the electronic device.

34. The electronic device displays the processed result.

For example, when detecting a user instruction at a location of the second-type application interface element, the electronic device displays a function application interface associated with the second-type application interface element.

A fourth stage: As shown in FIG. 5d, the fourth stage is a stage of restoring displaying of the basic function interface.

40. The electronic device determines that it is disconnected from the server.

41. The electronic device displays the basic function interface.

Embodiment 3

Figure 6:
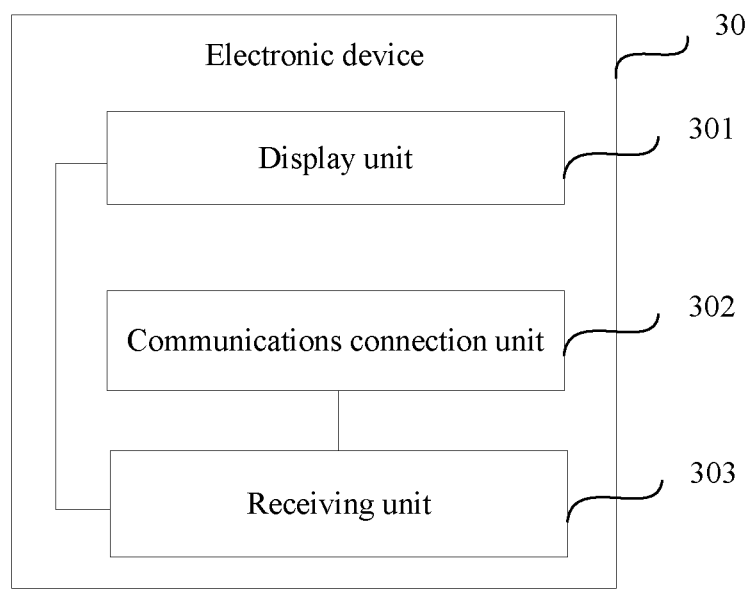
FIG. 6 is a schematic structural diagram of an electronic device according to Embodiment 3 of the present invention.

Embodiment 3 of the present invention further provides an electronic device 30. As shown in FIG. 6, the electronic device 30 includes:

a display unit 301, configured to display a basic function interface that includes a first-type application interface element, where the basic function interface is corresponding to a simple operating system, the simple operating system is used to implement a basic function application of the electronic device, and the first-type application interface element is used to enable the basic function application in the simple operating system;

a communications connection unit 302, configured to establish a communications connection to a server; and when the communications connection unit 302 establishes a communications connection to the server, a receiving unit 303, configured to receive a second-type application interface element that is of a complete operating system and that is sent by the server, where the complete operating system is used to implement the basic function application and an additional function application of the electronic device, and the second-type application interface element is used to enable the basic function application and the additional function application in the complete operating system; where the display unit 301 is further configured to display a system function interface that includes the second-type application interface element according to the second-type application interface element received by the receiving unit 303, where the system function interface is corresponding to the complete operating system.

The first-type application interface element refers to multiple application interface elements associated with the basic function application in the simple operating system.

The second-type application interface element refers to multiple application interface elements associated with the basic function application and the additional function application in the complete operating system.

According to the electronic device provided in Embodiment 3 of the present invention, the system function interface that includes the basic function and the additional function and that is displayed on the electronic device may be configured by the server. Compared with a manner in which a user or an operator configures an interface on an electronic device side in the prior art, this manner in which the interface is configured by the server has the following advantages: The user does not need to spend a long time for one-by-one configuration, and power consumption of the electronic device is greatly reduced during interface configuration; and the electronic device does not need to be transported to the operator for configuration, thereby reducing operating costs of the operator.

Optionally, in a specific embodiment of the present invention, the electronic device 30 further includes a first sending unit 304, and the first sending unit 304 sends verification information entered by the user to the server for verification when the communications connection unit 302 establishes a communications connection with the server.

In this case, the receiving unit 303 is specifically configured to: if the verification succeeds, receive the second-type application interface element that is of the complete operating system and that is sent by the server.

In the specific embodiment, the first sending unit sends a connection request to the server that stores the complete operating system, and the server returns a response to the electronic device after receiving the connection request, so as to complete a network connection between the server and the electronic device. The receiving unit receives the verification information that is used to log in to the server and that is entered by the user, and submits the verification information to the server. Then, the server verifies whether the verification information submitted by the electronic device is correct. If verification fails, the server returns a verification failure result to the electronic device, and the display unit displays a verification failure. Consequently, the electronic device cannot obtain the second-type application interface element of the complete operating system stored in the server. If verification succeeds, the server sends the second-type application interface element of the complete operating system stored in the server to the electronic device.

The verification information includes but is not limited to a user name, a password, and user biometric feature information. The biometric feature information includes but is not limited to any one piece of information such as a fingerprint, a voice print, or an iris.

Optionally, in a specific embodiment of the present invention, when the communications connection unit 302 is disconnected from the server, the display unit 301 is further configured to display the basic function interface on the electronic device, and a processing unit 305 obtains the basic function interface stored in the electronic device.

In addition, optionally, the receiving unit 303 is further configured to receive a first switching instruction for interface switching that is entered by the user, where the first switching instruction is used to switch the basic function interface to the system function interface.

The electronic device further includes a second sending unit 306, and the second sending unit 306 is configured to send the first switching instruction received by the receiving unit 303 to the server.

The receiving unit 303 is further configured to:

when the communications connection unit 302 establishes a connection to the server, and the server responds to the first switching instruction and sends the second-type application interface of the complete operating system, receive the second-type application interface element that is of the complete operating system and that is sent by the server.

It can be learned from the foregoing that data processing in response to an operation instruction entered by the user is completed on the server that stores the complete operating system, and a processor of the electronic device only needs to complete steps of receiving, sending, and controlling displaying of the display unit. This minimizes occupation of a processing resource. It is well known to a person skilled in the art that data processing needs to consume much electricity. Therefore, this processing manner can efficiently reduce power consumption of the electronic device, thereby prolonging a battery lifespan of the electronic device.

In addition, a physical function key that can be clicked or switched by the user may be disposed on the electronic device. When the user clicks or switches the physical function key, it indicates that the user enters an interface switching instruction on the electronic device. Alternatively, an interface switching option may be set on a display interface of the electronic device. For example, a menu for switching to the system function interface is set on the basic function interface of the electronic device, and a menu for switching to the basic function interface is set on the system function interface of the electronic device. When the user selects the interface switching option on the display interface of the electronic device, it indicates that the user enters an interface switching instruction on the electronic device.

Embodiment 4

Figure 7:
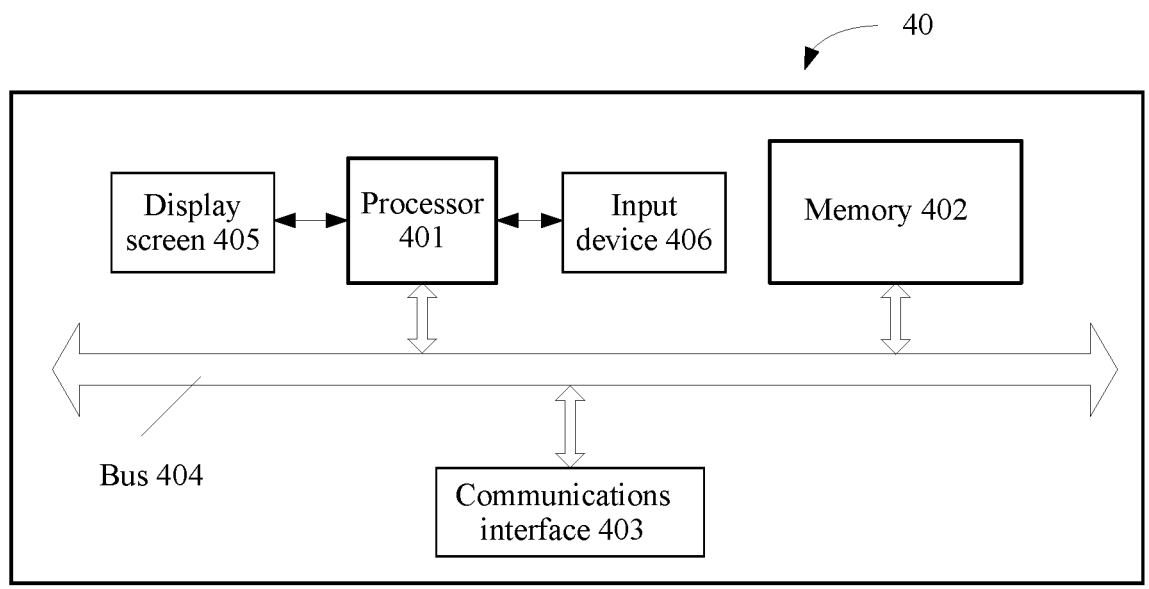
FIG. 7 is a schematic structural diagram of an electronic device according to Embodiment 4 of the present invention.

FIG. 7 shows another embodiment of an electronic device provided in Embodiment 4 of the present invention. As shown in FIG. 7, an electronic device 40 provided in Embodiment 4 includes a processor 401, a memory 402, a communications interface 403, a bus 404, a display screen 405, and an input device 406. The processor 401, the memory 402, and the communications interface 403 are connected to each other and complete mutual communication by using the bus 404. The bus 404 may be an industry standard architecture (ISA for short) bus, a Peripheral Component Interconnect (PCI for short) bus, an extended industry standard architecture (EISA for short) bus, or the like. The bus 404 may be classified into an address bus, a data bus, a control bus, and the like. For ease of representation, only one bold line is used in FIG. 7 for representation, but it does not indicate that there is only one bus or one type of bus.

The input device 406 is configured to receive an instruction entered by a user and transmits the instruction entered by the user to the processor 401. In this embodiment of the present invention, the input device 406 is specifically configured to: receive a turn-on instruction of the user and instruct the processor 401 to start a basic function interface; receive verification information entered by the user, where the verification information is used in a case in which the electronic device loads a system function interface when a server successfully verifies the verification information; and obtain an operation instruction from the user for the system function interface when the electronic device 40 loads the system function interface, where the operation instruction is used to operate a complete operating system in the server. The input device 406 may be a keyboard, a mouse, a stylus, or a touchscreen.

The communications interface 403 is used for network communication and interconnection between the electronic device and the server. The communications interface 403 may be a wired communications interface, for example, an Ethernet interface or a fiber interface; or may be a wireless communications interface, for example, a WiFi wireless WAN card, a Bluetooth module, or a cellular network access module.

The memory 402 is configured to store executable program code, and the program code includes a computer operation instruction. The memory 402 may include a high-speed RAM memory, and may further include a nonvolatile memory, for example, at least one magnetic disk memory. In this embodiment, the memory 402 is specifically configured to store a simple operating system.

The processor 401 runs a program corresponding to the executable program code by reading the executable program code stored in the memory 402, so as to:

display, on the display screen 405, a basic function interface that includes a first-type application interface element, where the basic function interface is corresponding to the simple operating system, the simple operating system is used to implement a basic function application of the electronic device 40, and the first-type application interface element is used to enable the basic function application in the simple operating system;

when the communications interface 403 establishes a connection to the server, receive a second-type application interface element that is of the complete operating system and that is sent by the server, where the complete operating system is used to implement the basic function application and an additional function application of the electronic device, and the second-type application interface element is used to enable the basic function application and the additional function application in the complete operating system; and display, on the display screen 405, the system function interface that includes the second-type application interface element according to the received second-type application interface element, where the system function interface is corresponding to the complete operating system.

It can be learned from the foregoing that, when the input device 406 receives the turn-on instruction, that the processor 401 is configured to execute and distribute the instruction specifically includes: instructing to display, on the display screen 405, the basic function interface corresponding to the simple operating system; and when the processor 401 determines that a network connection to the server is normal, instructing the input device 406 to obtain the verification information entered by the user, sending the operation instruction from the user for the system function interface to the communications interface 403, sending the operation instruction to the server by using the communications interface, and instructing to display a received processing result on the display screen 405. The processor 401 may be a central processing unit (CPU for short), an application-specific integrated circuit (ASIC for short), or one or more integrated circuits configured to implement this embodiment of the present invention.

Optionally, in a specific embodiment of the present invention, when the communications interface 403 establishes a communications connection to the server, the processor 401 is further configured to: send the verification information entered by the user by using the input device 406 to the server for verification; and if the verification succeeds, receive the second-type application interface element that is of the complete operating system and that is sent by the server.

Optionally, in a specific embodiment of the present invention, when the communications interface 403 is disconnected from the server, the processor 401 is further configured to: obtain the basic function interface stored in the electronic device 40 and display the basic function interface on the display screen 405.

Optionally, in a specific embodiment of the present invention, the input device 406 receives a first switching instruction for interface switching that is entered by the user, where the first switching instruction is used to switch the basic function interface to the system function interface; and send the received first switching instruction to the server. Then, when the communications interface 403 establishes a communications connection to the server, and the server responds to the first switching instruction and sends the second-type application interface element of the complete operating system, the processor 401 receives the second-type application interface element that is of the complete operating system and that is sent by the server.

The electronic device may be a touchscreen phone, a tablet computer, a notebook computer, an ultra-mobile personal computer (UMPC), a netbook, a personal digital assistant (PDA), or the like.

It should be noted that in addition to having the functions described above, the processor 401 may be further configured to implement other procedures in the foregoing method embodiments, and details are not described herein.

It should be further noted that, for division of each functional unit in the processor 401, reference may be made to the foregoing embodiments of the electronic device, and details are not described herein.

Embodiment 5

Figure 8:
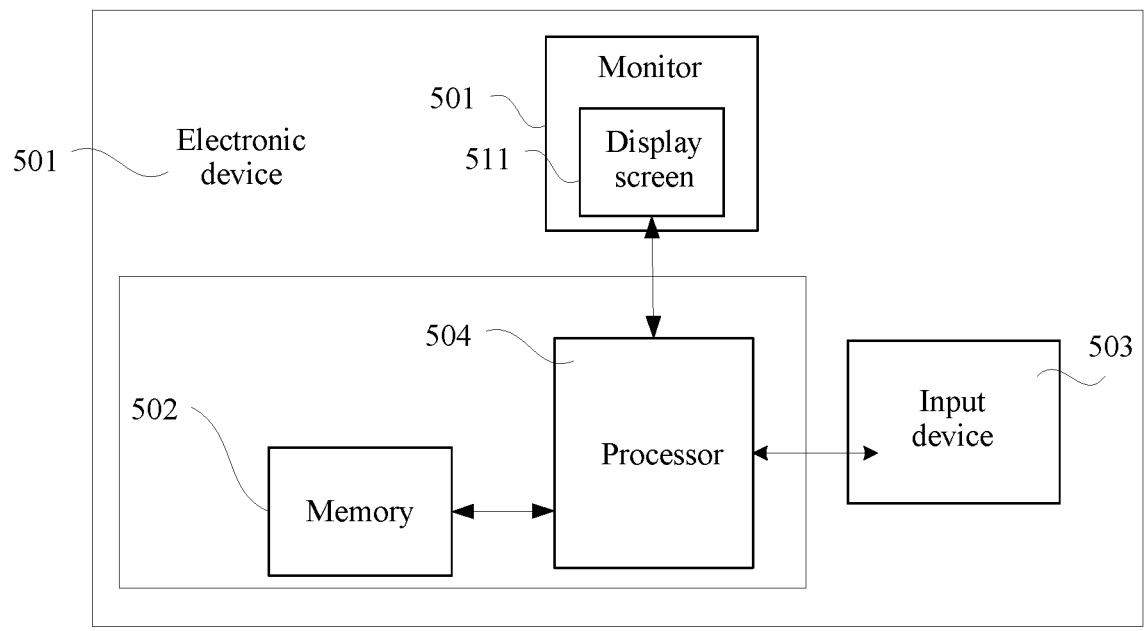
FIG. 8 is a schematic structural diagram of an electronic device of a graphical user interface according to Embodiment 5 of the present invention.

Embodiment 5 of the present invention further provides a graphical user interface on an electronic device. As shown in FIG. 8, an electronic device 50 includes a monitor 501, a memory 502, multiple function application programs, an input device 503, and one or more processors 504 configured to execute one or more programs stored in the memory. The monitor 501 includes a display screen 511, and the graphical user interface includes:

a basic function interface used to display a first-type application interface element and the like, and a system function interface used to display a second-type application interface element and the like.

The basic function interface is corresponding to a simple operating system, the simple operating system is used to implement a basic function application of the electronic device, the system function interface is corresponding to a complete operating system, and the complete operating system is used to implement the basic function application and an additional function application of the electronic device.

The displaying a basic function interface that includes a first-type application interface element and the like includes: displaying the first-type application interface element on the display screen, where the first-type application interface element is used to enable the basic function application program in the simple operating system; and stopping displaying the basic function interface when the processor 504 receives an instruction that is for displaying the system function interface and that is sent by a user by using the electronic device; and displaying the system function interface that includes the second-type application interface element includes: displaying the second-type application interface element on the display screen, where the second-type application interface element is used to enable the basic function application program and the additional function application program in the complete operating system.

In this embodiment, the first-type application interface element refers to multiple application interface elements associated with the basic function application in the simple operating system. The second-type application interface element refers to multiple application interface elements associated with the basic function application and the additional function application in the complete operating system.

In this embodiment, a server may serve multiple electronic devices, and therefore the basic function in the complete operating system stored in the server may be loaded into multiple electronic devices. However, it is likely that basic functions in simple operating systems separately stored in these terminals are different. For example, a basic function of a feature phone is different from that of a smartphone, and function compatibility of these electronic devices is not always the same. Therefore, not all the basic functions in the complete operating system stored in the server are loaded into each electronic device that the server serves, and the loaded basic functions are not necessarily to be exactly the same as basic functions in a simple operating system stored in the electronic device. Therefore, the basic functions in the complete operating system stored in the server include at least some basic functions in the simple operating system stored in the electronic device. That is, the basic functions in the complete operating system may include all the basic functions in the simple operating system, or may include some basic functions in the simple operating system.

Specifically, an interface and an application interface element are displayed on the display screen of the electronic device in the following two display forms.

Figure 9:
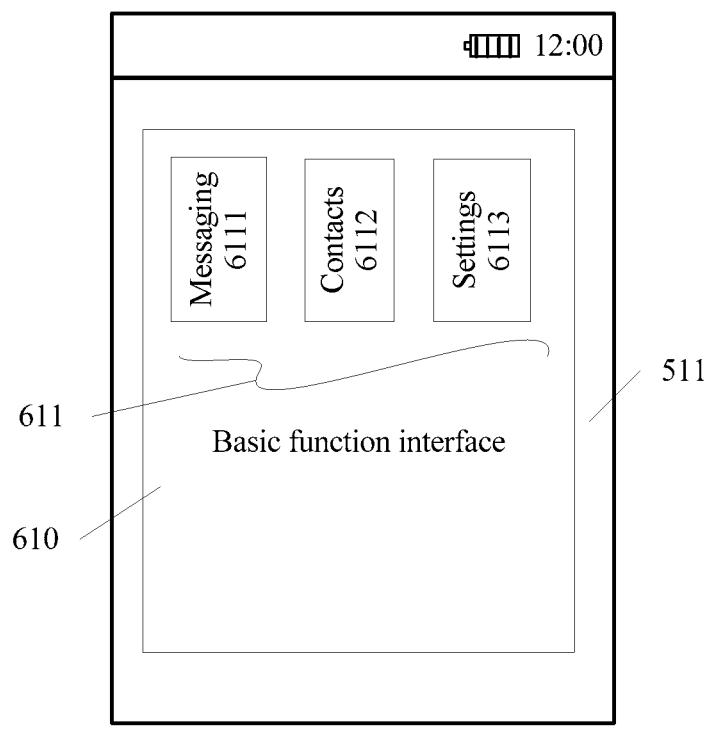
FIG. 9 is an example of a schematic diagram of displaying, on a graphical user interface, a basic function interface that includes a first-type application interface element according to Embodiment 5 of the present invention.

Form 1: FIG. 9 shows a basic function interface 610 that displays a first-type application interface element 611.

Specifically, when the electronic device receives a turn-on instruction sent by the user, the processor 504 of the electronic device enables the simple operating system stored in the memory 502 and programs of multiple basic function applications of the simple operating system according to the turn-on instruction, and instructs to display, on the display screen 511, first-type application interface elements 611 associated with these basic function applications. When the processor 504 instructs to display, on the display screen 511, the first-type application interface elements associated with these basic function applications, an interface that includes the first-type application interface elements 611 associated with the basic function applications is displayed on the display screen 511 of the electronic device. The interface is the basic function interface 610 in the simple operating system.

The first-type application interface elements 611 may be multiple application interface elements. This type of application interface element includes Dialer, Messaging, Contacts, Camera, Settings, and the like. In this embodiment of the present invention, for example, referring to FIG. 9, the first-type application interface elements 611 may be three application interface elements: Messaging 6111, Contacts 61112, and Settings 6113. These application interface elements are respectively used to enable three basic function applications in the simple operating system stored the electronic device: Messaging, Contacts, and Settings.

Figure 10:
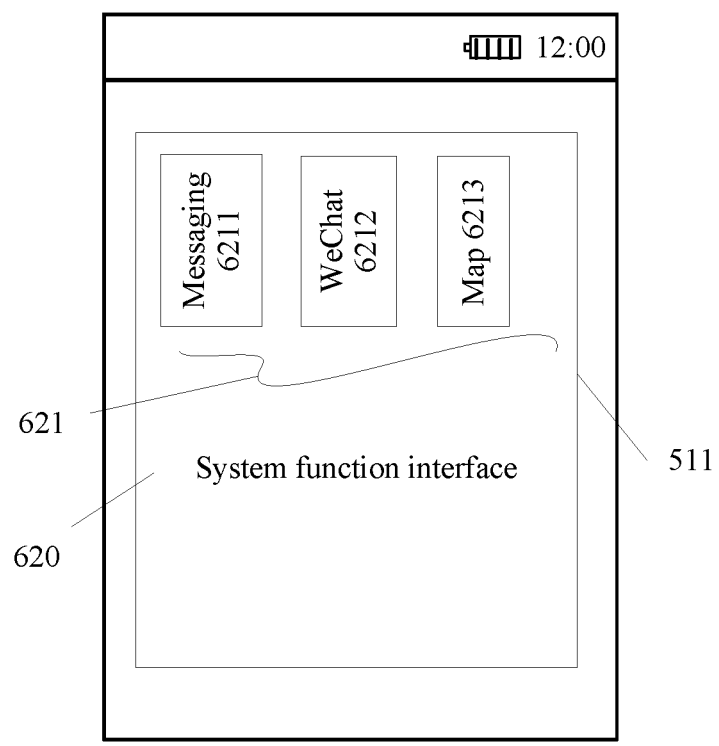
FIG. 10 is an example of a schematic diagram of displaying, on a graphical user interface, a system function interface that includes a second-type application interface element according to Embodiment 5 of the present invention.

Form 2: FIG. 10 shows a system function interface 620 that displays a second-type application interface element 621.

Specifically, when the electronic device receives an instruction that is for displaying the system function interface and that is sent by the user, the processor 504 of the electronic device instructs to stop displaying the basic function interface being displayed, and sends the instruction for displaying the system function interface to the server connected to the electronic device. A processor of the server enables the complete operating system stored in the memory and programs of multiple basic function applications and additional function applications of the complete operating system according to the instruction. Then, the server sends second-type application interface elements 621 associated with the basic function applications and the additional function applications to the electronic device. The processor 504 of the electronic device receives the second-type application interface elements 621 and instructs to display the second-type application interface elements 621 on the display screen 511. When the electronic device instructs to display the second-type application interface elements on the display screen 511, an interface that includes the second-type application interface elements 621 is displayed on the display screen 511 of the electronic device. The interface is the system function interface 620 in the complete operating system.

The second-type application interface elements 621 include multiple application interface elements. This type of application interface element includes Dialer, Messaging, Contacts, Camera, Settings, Media player, Game, Radio, Flashlight, Microblog, WeChat, Map, Browser, Caller ID Display, Ring Back Tone service, Bluetooth, infrared, WiFi, and the like. In this embodiment of the present invention, for example, referring to FIG. 10, the second-type application interface elements 621 may be three application interface elements: Messaging 6211, WeChat 6212, and Map 6213. These application interface elements are respectively used to enable a basic function application Messaging and two additional function applications WeChat and Map in the complete operating system stored in the server.

Optionally, the graphical user interface further includes: a verification information interface used to display user name information, password information, and the like, and a prompt interface used to display a verification information error.

The verification information interface used to display the user name information, the password information, and the like is displayed, and the verification information interface is located above the basic function interface. If the processor 504 determines that the verification information is correct, displaying of the basic function interface and the verification information interface stops on the display screen 511, and the system function interface used to display the second-type application interface elements 621 and the like is displayed. If the processor 504 determines that the verification information is wrong, the prompt interface used to display a verification information error is displayed on the display screen 511.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment.

It should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present invention, connection relationships between modules indicate that the modules have communications connections with each other, which may be specifically implemented as one or more communications buses or signal cables. A person of ordinary skill in the art may understand and implement the embodiments of the present invention without creative efforts.

A person of ordinary skill in the art may understand that all or a part of the processes of the apparatuses in the embodiments may be implemented by a computer program instructing relevant hardware. The program may be stored in a computer readable storage medium. When the program runs, the processes of the apparatuses in the embodiments are performed. The foregoing storage medium may include: a magnetic disk, an optical disc, a read-only memory (ROM), or a random access memory (RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interface processing method, comprising:
    displaying a basic function interface that comprises a first-type application interface element, wherein the basic function interface is corresponding to a simple operating system, the simple operating system is used to implement a basic function application of an electronic device, and the first-type application interface element is used to enable the basic function application in the simple operating system;
    receiving, by the electronic device, a first switching instruction for interface switching that is entered by a user, wherein the first switching instruction is used to switch the basic function interface to the system function interface;
sending, by the electronic device, the received first switching instruction to the server;
when the electronic device establishes a connection to the server, and the server responds to the first switching instruction and sends the second-type application interface element of the complete operating system, receiving, by the electronic device, a second-type application interface element that is of a complete operating system and that is sent by a server, wherein the complete operating system is used to implement the basic function application and an additional function application of the electronic device, and the second-type application interface element is used to enable the basic function application and the additional function application in the complete operating system;
displaying a system function interface that comprises the second-type application interface element according to the second-type application interface element received by the electronic device, wherein the system function interface is corresponding to the complete operating system;
wherein after the displaying a system function interface that comprises the second-type application interface element, the interface processing method further comprises:
receiving, by the electronic device, a second switching instruction for interface switching that is entered by the user, wherein the second switching instruction is used to switch the system function interface to the basic function interface; and
displaying the basic function interface that comprises the first-type application interface element according to the received second switching instruction.

2. The interface processing method according to claim 1, wherein
when the electronic device establishes a connection to the server, before the receiving, by the electronic device, a second-type application interface element that is of a complete operating system and that is sent by a server, the interface processing method further comprises:
sending, by the electronic device, verification information entered by a user to the server for verification; and
the receiving, by the electronic device, a second-type application interface element that is of a complete operating system and that is sent by a server is specifically: if the verification succeeds, receiving, by the electronic device, the second-type application interface element that is of the complete operating system and that is sent by the server.

3. The interface processing method according to claim 1 wherein
after the displaying a system function interface that comprises the second-type application interface element according to the second-type application interface element received by the electronic device, the interface processing method further comprises:
when the electronic device is disconnected from the server, obtaining the basic function interface stored in the electronic device, and displaying the basic function interface on the electronic device.

4. An electronic device, comprising: a display screen, an input device, a processor, a memory, a communications interface, and a bus, wherein the processor, the memory, and the communications interface are connected and complete mutual communication by using the bus, wherein
the input device is configured to receive an instruction entered by a user, and transmit the instruction entered by the user to the processor;
the memory is configured to store executable program code, wherein the program code comprises a computer operation instruction; and
the processor runs a program corresponding to the executable program code by reading the executable program code stored in the memory, so as to:
display, on the display screen, a basic function interface that comprises a first-type application interface element, wherein the basic function interface is corresponding to a simple operating system, the simple operating system is used to implement a basic function application of the electronic device, and the first-type application interface element is used to enable the basic function application in the simple operating system;
receive a first switching instruction for interface switching that is entered by the user, wherein the first switching instruction is used to switch the basic function interface to the system function interface;
send the received first switching instruction to the server;
when the communications interface establishes a connection to the server, and the server responds to the first switching instruction and sends the second-type application interface element of the complete operating system, receive a second-type application interface element that is of a complete operating system and that is sent by a server, wherein the complete operating system is used to implement the basic function application and an additional function application of the electronic device, and the second-type application interface element is used to enable the basic function application and the additional function application in the complete operating system; and
display, on the display screen, a system function interface that comprises the second-type application interface element according to the second-type application interface element received by the electronic device, wherein the system function interface is corresponding to the complete operating system;
wherein after the displaying a system function interface that comprises the second-type application interface element,
the input device is configured to receive a second switching instruction for interface switching that is entered by the user, wherein the second switching instruction is used to switch the system function interface to the basic function interface; and
the processor runs the program corresponding to the executable program code by reading the executable program code stored in the memory, so as to display the basic function interface that comprises the first-type application interface element according to the received second switching instruction.

5. The electronic device according to claim 4, wherein the processor is further configured to:
when the communications interface establishes a communications connection to the server, send verification information entered by the user by using the input device to the server for verification; and
if the verification succeeds, receive the second-type application interface element that is of the complete operating system and that is sent by the server.

6. The electronic device according to claim 4, wherein the processor is further configured to:
   when the communications interface is disconnected from the server, obtain the basic function interface stored in the electronic device, and display the basic function interface on the display screen.

\* \* \* \* \*